United States Patent
Huang et al.

(10) Patent No.: US 6,722,048 B2
(45) Date of Patent: Apr. 20, 2004

(54) LASER PROJECTION APPARATUS FOR POINT AND LINE

(75) Inventors: Chao-Chi Huang, Taipei (TW); Sheng-Ching Wu, Taipei (TW)

(73) Assignee: Quarton, Inc. (TW)

( * ) Notice: Subject to any disclaimer, the term of this patent is extended or adjusted under 35 U.S.C. 154(b) by 140 days.

(21) Appl. No.: 10/027,120

(22) Filed: Dec. 26, 2001

(65) Prior Publication Data

US 2003/0029048 A1 Feb. 13, 2003

(30) Foreign Application Priority Data

Aug. 10, 2001 (TW) ..................................... 90213627 U

(51) Int. Cl.[7] ............................................. G01C 15/00
(52) U.S. Cl. ...................... 33/286; 33/DIG. 21; 33/281; 33/290
(58) Field of Search .......................... 33/281, 282, 283, 33/285, 286, 290, 291, DIG. 21

(56) References Cited

U.S. PATENT DOCUMENTS

| | | | | |
|---|---|---|---|---|
| 5,212,889 A | * | 5/1993 | Lysen | 33/286 |
| 5,272,814 A | * | 12/1993 | Key | 33/290 |
| 5,485,266 A | * | 1/1996 | Hirano et al. | 356/249 |
| 5,539,990 A | * | 7/1996 | Le | 33/283 |
| 5,552,886 A | * | 9/1996 | Kitajima et al. | 356/250 |
| 5,724,744 A | * | 3/1998 | Bozzo | 33/291 |
| 5,864,956 A | * | 2/1999 | Dong | 33/227 |
| 5,872,657 A | * | 2/1999 | Rando | 359/629 |
| 6,035,540 A | * | 3/2000 | Wu et al. | 33/286 |
| 6,195,901 B1 | * | 3/2001 | Falb | 33/286 |
| 6,202,312 B1 | * | 3/2001 | Rando | 33/227 |
| 6,427,347 B1 | * | 8/2002 | Butler, Sr. | 33/286 |
| 6,539,638 B1 | * | 4/2003 | Pelletier | 33/290 |
| 2002/0083603 A1 | * | 7/2002 | Jang | 33/281 |

* cited by examiner

Primary Examiner—Diego Gutierrez
Assistant Examiner—Yaritza Guadalupe
(74) Attorney, Agent, or Firm—Raymond Sun

(57) ABSTRACT

A laser projection apparatus has an adjustment platform having a base seat, a platform portion that is adjustably coupled to the base seat, and an adjustment mechanism that is operatively coupled to the base seat and the platform portion to adjust the inclination angle of the platform portion with respect to the base seat. The apparatus also has a frame body that is connected to the adjustment platform, and a column that is suspended by the frame body and which is separated from the adjustment platform by a distance. The apparatus further includes a first projection light-source mechanism that is connected to the column and which projects a straight light that is parallel to a central axis, and a second projection light-source mechanism which is connected to the column and which projects a light ring that is transverse to the central axis.

20 Claims, 14 Drawing Sheets

LASER PROJECTION APPARATUS FOR POINT AND LINE

BACKGROUND OF THE INVENTION

1. Field of the Invention

The present invention relates to a laser projection apparatus for projecting a point and a line (hereinafter "for point and line"), and in particular, to a laser projection apparatus for point and line that has two projection light-source mechanisms.

2. Description of the Prior Art

Recently, due to the increase of the population in cities, and the scarcity of land, building projects have focused on building upwardly, which means that many skyscrapers have been built up in cities like trees in a jungle. Because skyscrapers are built up from the ground surface, the measuring point for building up, and base line for measuring and demarcating operations, for the base and interior of buildings have become very important key-points.

When the above operations are applied to instrument measurements for demarcating distance or for plumb fixing-point, it can be difficult to create an actual straight line, and it is also difficult to control the placing directions and angles. In addition, because the plumb fixing-point is sometimes interfered with and swung by outside influences (e.g., wind), and further because the legs of the instruments are set up for the convenience of movement or adjustment, it is difficult to accurately make the plumb aim at the starting measuring-point. The quality and procedure of the operation are therefore compromised.

During building construction and decoration construction, the uneven nature of the ground can often make the arrangement and adjustment of the legs of a plumb or instrument difficult to carry out. As a result, it is often difficult to accurately carry out the measurement and demarcation for horizontal and vertical lines because the angle and direction of the measurement may be shifted, and because the measurement may not be able to bring out an actual straight line.

Thus, there remains a need for a laser projection apparatus that overcomes the drawbacks identified above.

SUMMARY OF THE DISCLOSURE

It is an object of the present invention to provide a laser projection apparatus that projects a vertical line that is vertical to the ground surface.

It is another object of the present invention to provide a laser projection apparatus that projects a horizontal line that is parallel to the ground surface, or any projection point that has the same horizontal height.

It is yet another object of the present invention to provide a laser projection apparatus that can accurately project actual horizontal and vertical lines even when the apparatus is rested on an undulated or uneven topography.

It is yet another object of the present invention to provide a laser projection apparatus that minimizes vibration and interference from external influences.

To achieve the above objectives, the present invention provides a laser projection apparatus that has an adjustment platform having a base seat, a platform portion that is adjustably coupled to the base seat, and an adjustment mechanism that is operatively coupled to the base seat and the platform portion to adjust the inclination angle of the platform portion with respect to the base seat. The apparatus also has a frame body that is connected to the adjustment platform, and a column that is suspended by the frame body and which is separated from the adjustment platform by a distance. The apparatus further includes a first projection light-source mechanism that is connected to the column and which projects a straight light that is parallel to a central axis, and a second projection light-source mechanism which is connected to the column and which projects a light ring that is transverse to the central axis.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
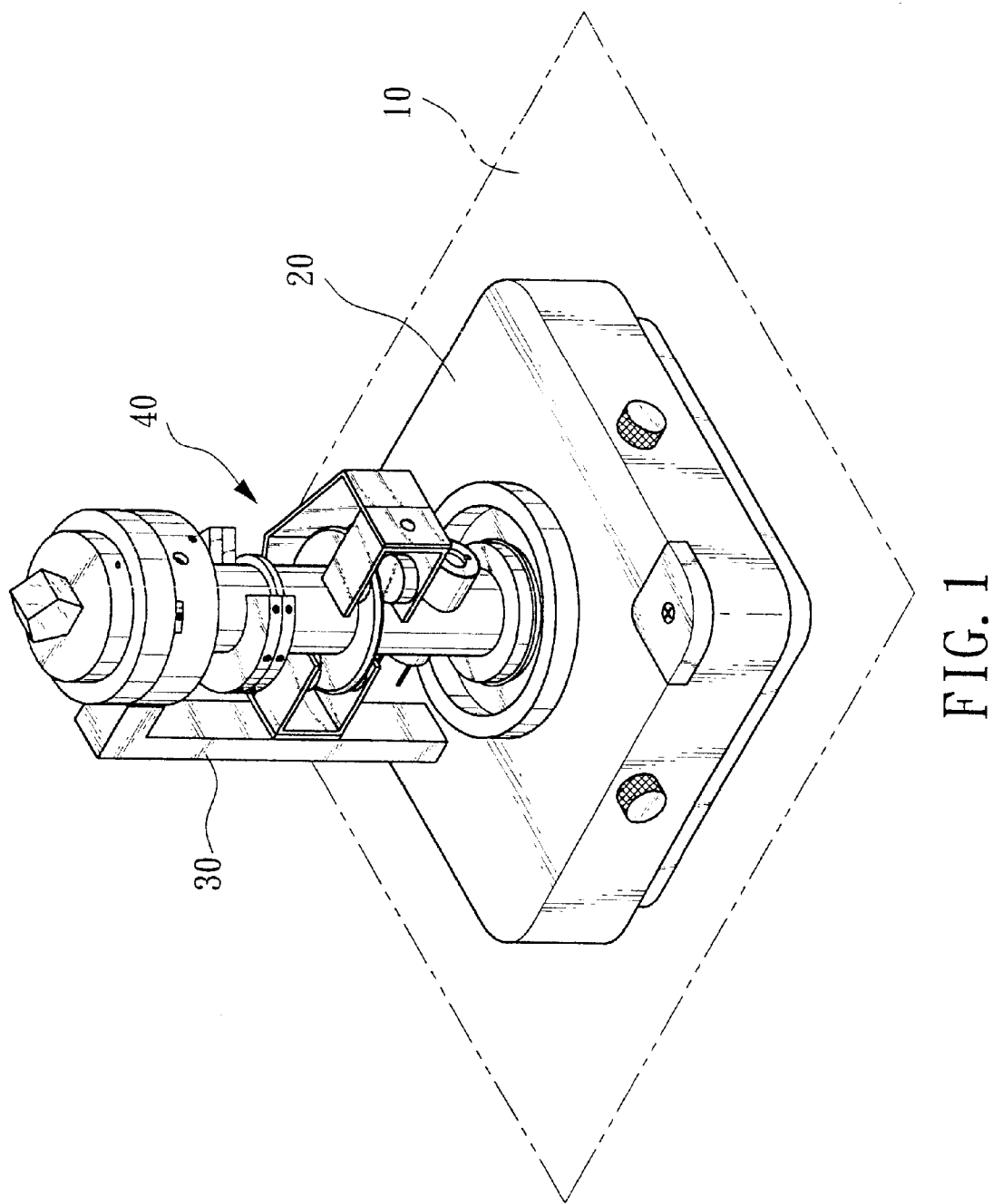
FIG. 1 is a perspective view a laser projection apparatus according to one embodiment of the present invention.

FIG. 1 is a perspective view of a laser projection apparatus for point and line according to one embodiment of the present invention. The laser projection apparatus includes an adjustment platform 20, a frame body 30, and a main body 40. The adjustment platform 20 is adapted to be placed on a surface, which can be a working table 10 or the ground. The adjustment platform 20 can also be secured on a multi-legged frame or fixing frame (not shown) to allow the adjustment platform 20 to be used on a surface having varying topographies. The frame body 30 may be secured to a top surface of the adjustment platform 20 along one side thereof, and is connected to the main body 40 to support the main body 40 above the adjustment platform 20 during use. The frame body 30 is illustrated as being a square or rectangular column, but the column can also assume other configurations, including but not limited to circular and oval.

Figure 2:
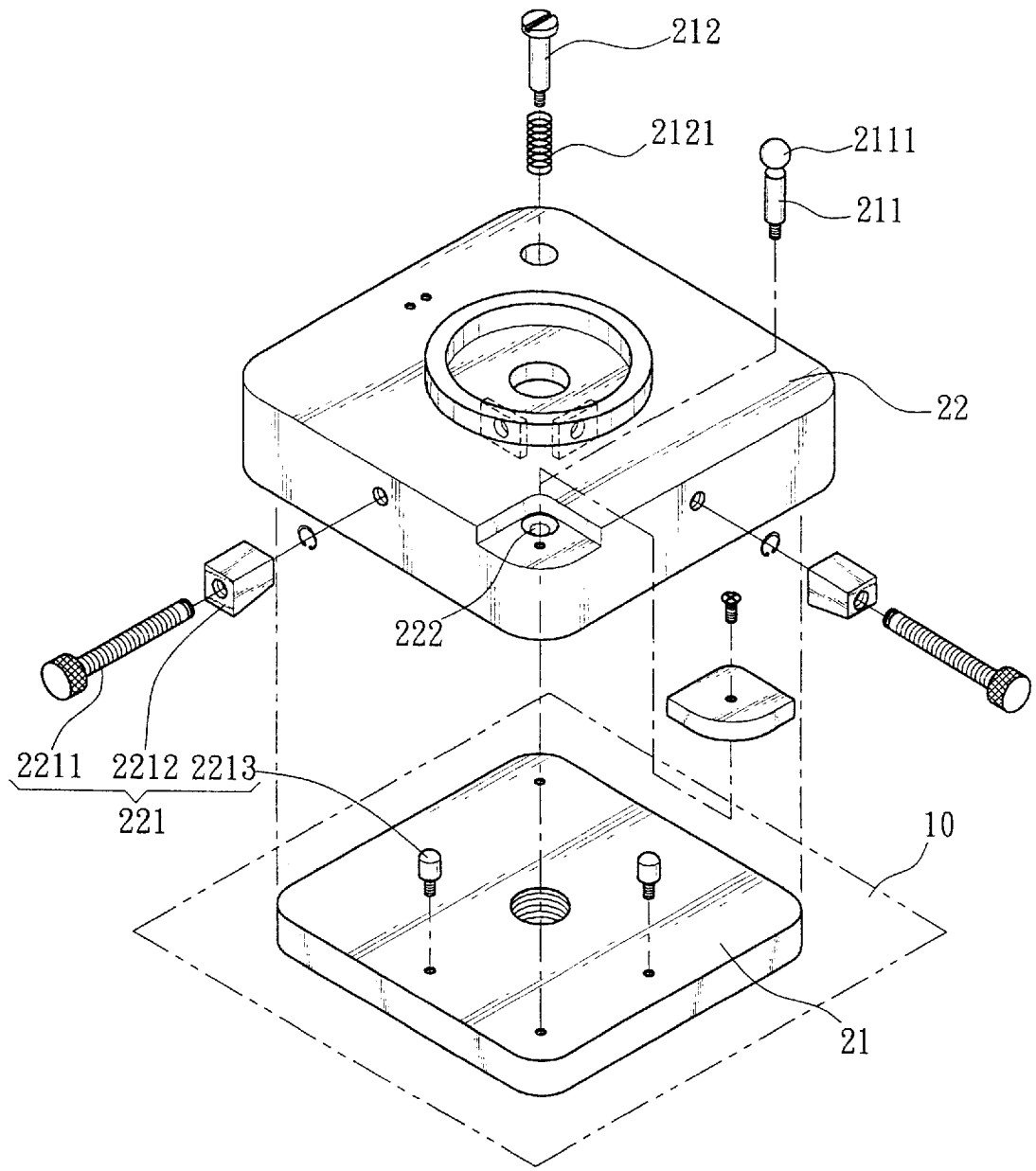
FIG. 2 is an exploded perspective view of the adjustment platform of the apparatus of FIG. 1.

FIG. 2 is an exploded perspective view of the adjustment platform 20. The adjustment platform 20 includes a base seat 21 and a platform portion 22, which are illustrated as having a four-sided (e.g., square or rectangular) configuration, although the base seat 21 can have any other desired configuration (e.g., circular). The four-sided configuration of the base seat 21 and the platform portion 22 provide four corners, and holes (e.g., see 222) are provided at two opposing corners of the base seat 21 and the platform portion 22 along a diagonal line. A first fixation bolt 211 (having a ball pivoting end 2111) is inserted through a hole 222 in the base seat 21 and the platform portion 22 to couple the base seat 21 to the platform portion 22. A second fixation bolt 212 can be provided with an elastic element 2121 that surrounds the bolt 212 and which is positioned between the base seat 21 and the platform portion 22. The elastic element 2121 provides an elastic bias between the base seat 21 and the platform portion 22 so that the platform portion 22 can be adjusted to assume a greater number of variable angles with respect to the base seat 21, as described below.

Figure 3A:
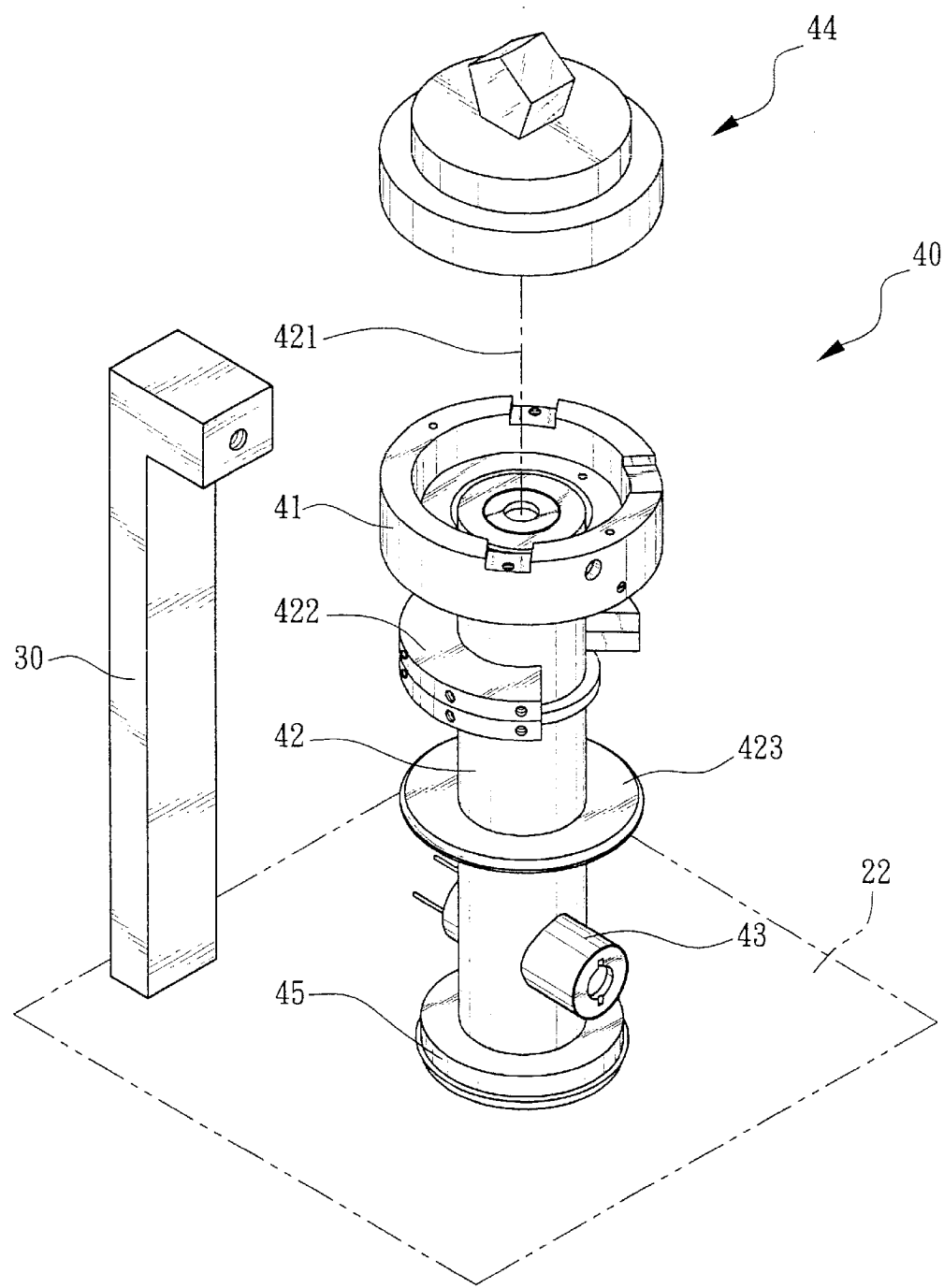
FIG. 3A is an exploded perspective view of a portion of the apparatus of FIG. 1.
Figure 3B:
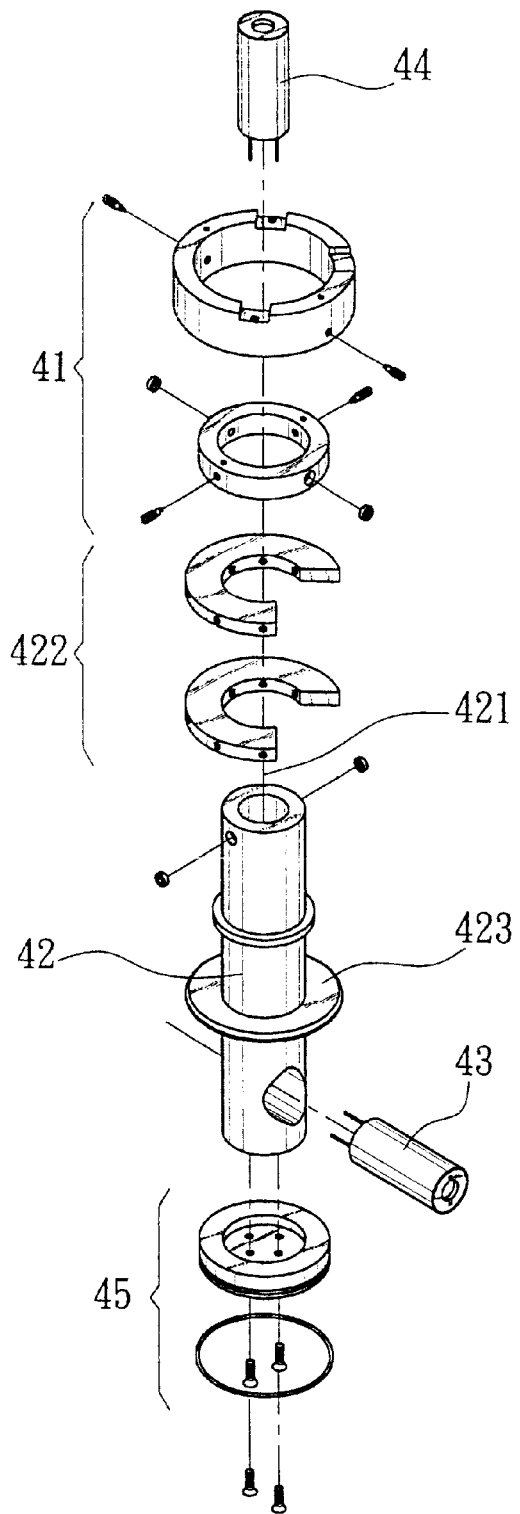
FIG. 3B is an exploded perspective view of a portion of the apparatus of FIG. 1.
Figure 3C:
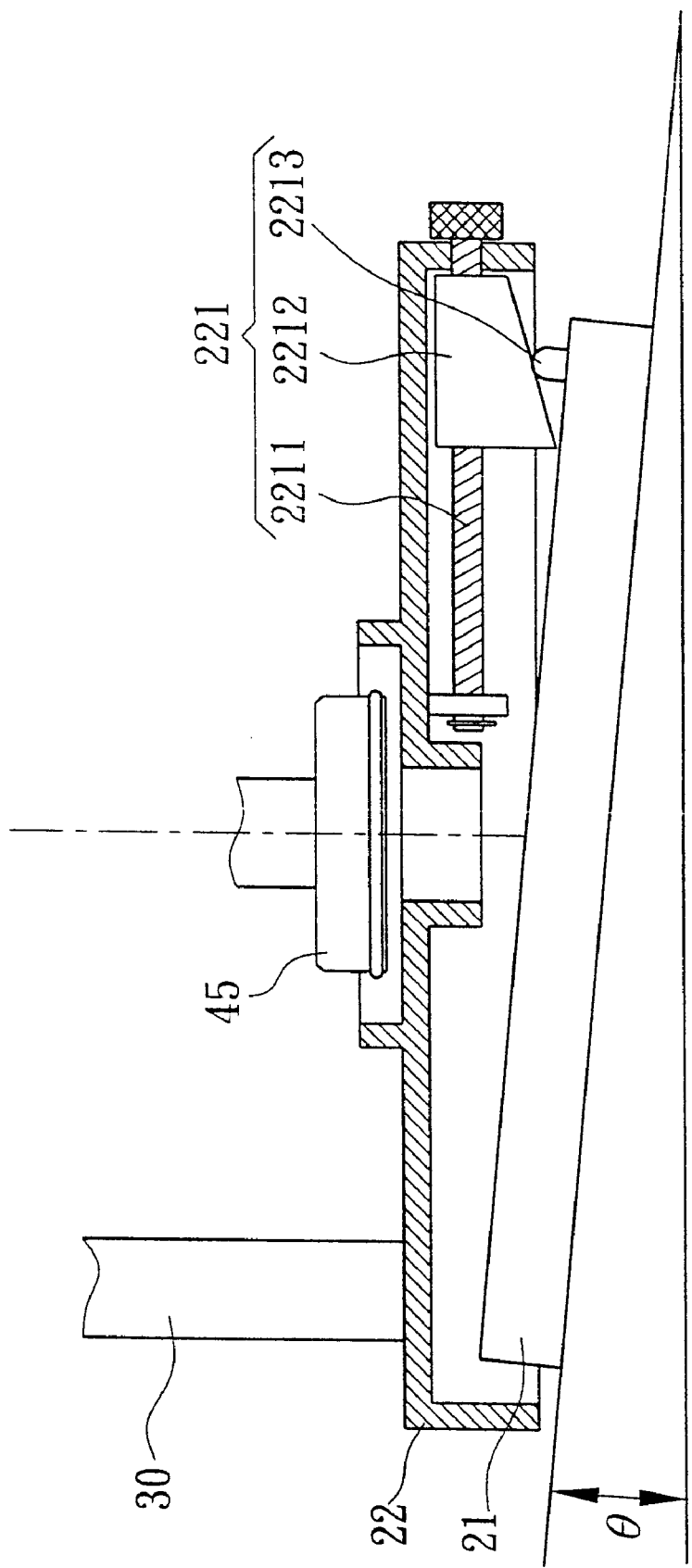
FIG. 3C is a cross-sectional view of the adjustment platform of the apparatus of FIG. 1.

Referring to FIGS. 2 and 3C, the inclination angle of the platform portion 22 with respect to the base seat 21 may be adjusted and varied by an adjustment mechanism 221. The adjustment mechanism 221 includes a screw rod 2211, an inclination block 2212 having a lower ramped or angled surface, and a protrusion block 2213. The protrusion block 2213 is threadably connected to a hole in the upper surface of the base seat 21, the inclination block 2212 is retained inside the platform portion 22, and the screw rod 2211 is inserted through an opening in the side wall of the platform portion 22 and through a bore in the inclination block 2212. As best shown in FIG. 3C, the lower ramped surface of the inclination block 2212 contacts the protrusion block 2213 on the base seat 21. When the screw rod 2211 is rotated, the inclination block 2212 experiences linear displacement along the axis of the screw rod 2211, which simultaneously causes the protrusion block 2213 to travel either up or down along the lower ramped surface of the inclination block 2212. Thus, by rotating the screw rod 2211, the user can change and adjust the inclination angle between the base seat 21 and the platform portion 22, which also changes and adjusts the plane inclination height of the platform portion 22. As illustrated below and in FIG. 3C, this adjustment between the base seat 21 and the platform portion 22 allows the laser projection apparatus to be used on a surface that has varying and uneven topography. In the preferred embodiment of the present invention, there are two sets of adjustment mechanisms 221, but any number of adjustment mechanisms 221 can also be provided without departing from the spirit and scope of the present invention.

FIGS. 3A and 3B illustrate the main body 40 of the present invention. The main body 40 is connected to the frame body 30 and suspended therefrom by the force of gravity. The main body 40 includes a hanging body 42 that carries a weight, a hanging mechanism 41, a counterweight mechanism 422, a damping mechanism 423, a first projection light-source mechanism 43, a second projection light-source mechanism 44 and an alarm mechanism 45. The hanging body 42 is a column structure having a central axis line 421. Referring also to FIG. 3C, when the adjustment platform 20 is located on a plane of the surface at an inclination angle "theta", the hanging body 42 may be secured to the frame body 30 and suspended by gravity, so that the central axis line 421 is therefore vertical to the ground surface. At this time, with the base seat 21 placed on the surface, the central axis line 421 can be made vertical to the surface by adjusting the inclination angle of the platform portion 22 with respect to the base seat 21 in the manner described above.

Figure 4:
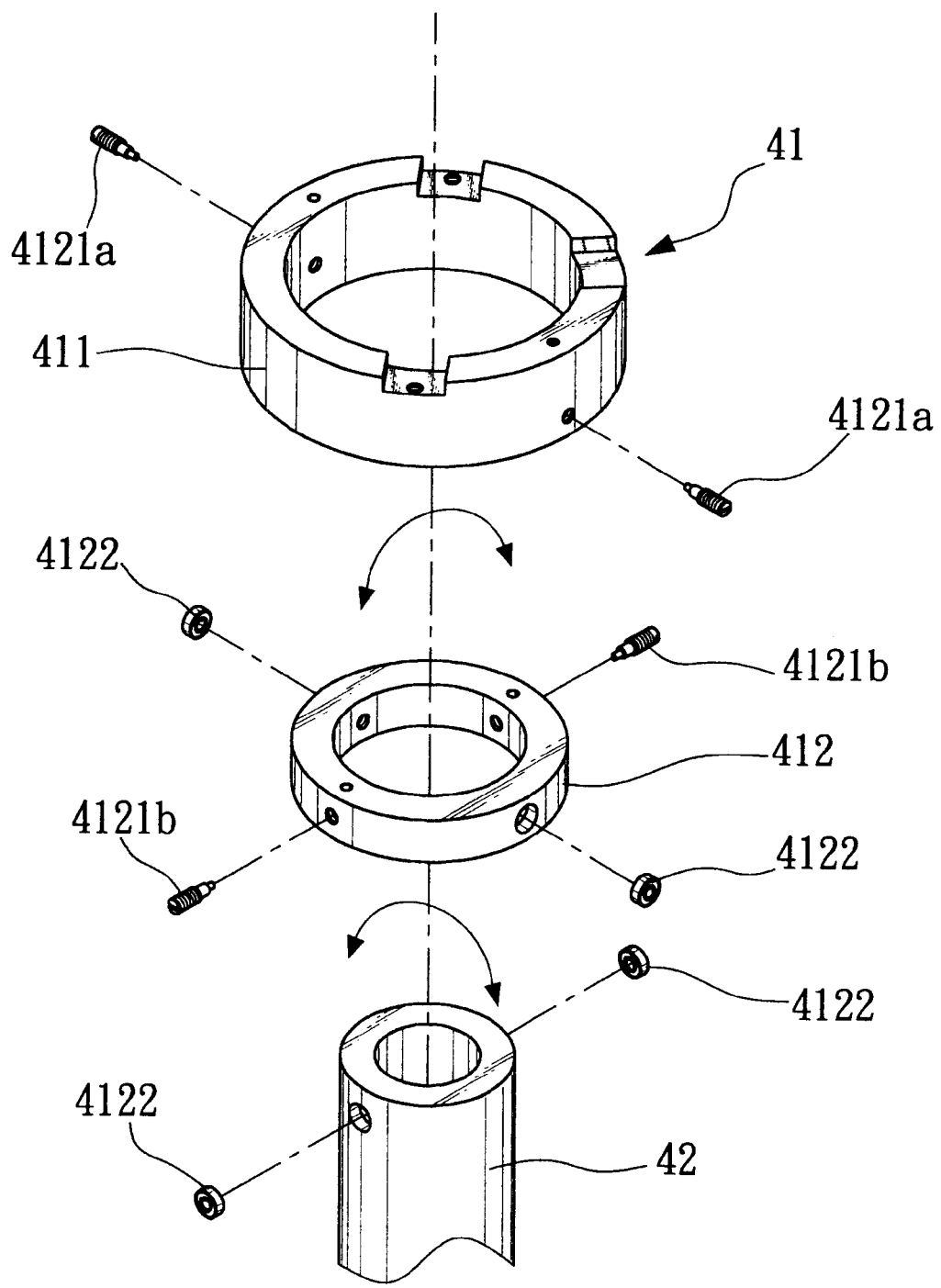
FIG. 4 is an exploded perspective view of the hanging mechanism of the apparatus of FIG. 1.

Referring to FIG. 4, the hanging mechanism 41 is connected to the frame body 30 and kept at an appropriate height from the platform portion 22. The hanging mechanism 41 includes an outer ring sheath 411 and an inner ring sheath 412. The outer ring sheath 411 is connected with the frame body 30, while the inner ring sheath 412 is coupled to the interior of the outer ring sheath 411 via two sets of connectors (which can be threaded screws) that correspond to each other. A first set of connectors 4121*a* connects the inner ring sheath 412 to the outer ring sheath 411, and a second set of connectors 4121*b* connects the inner ring sheath 412 to the hanging body 42. Corresponding openings are provided in the sheaths 411, 412 and the hanging body 42 through which the appropriate connectors 4121*a*, 4121*b* can be inserted to effectuate the connections. Each of the connectors 4121*a* and 4121*b* passes through a corresponding bearing 4122 to provide a smooth connection between the respective sheaths 411, 412 and the hanging body 42. The two sets of connectors 4121*a*, 4121*b* extend through axes that intersect at the central point of the inner ring sheath 412, and that are perpendicular to each other. As a result, the hanging body 42 may be suspended from the hanging mechanism 41 in a manner where the intersection point of the axes of the connectors 4121*a*, 4121*b* intersects with the central axis line 421 of the hanging body 42. Although the outer ring sheath 411 and inner ring sheath 412 are configured as circular rings, it is possible to configure the sheaths 411, 412 in any desired configuration (e.g., square).

Figure 5A:
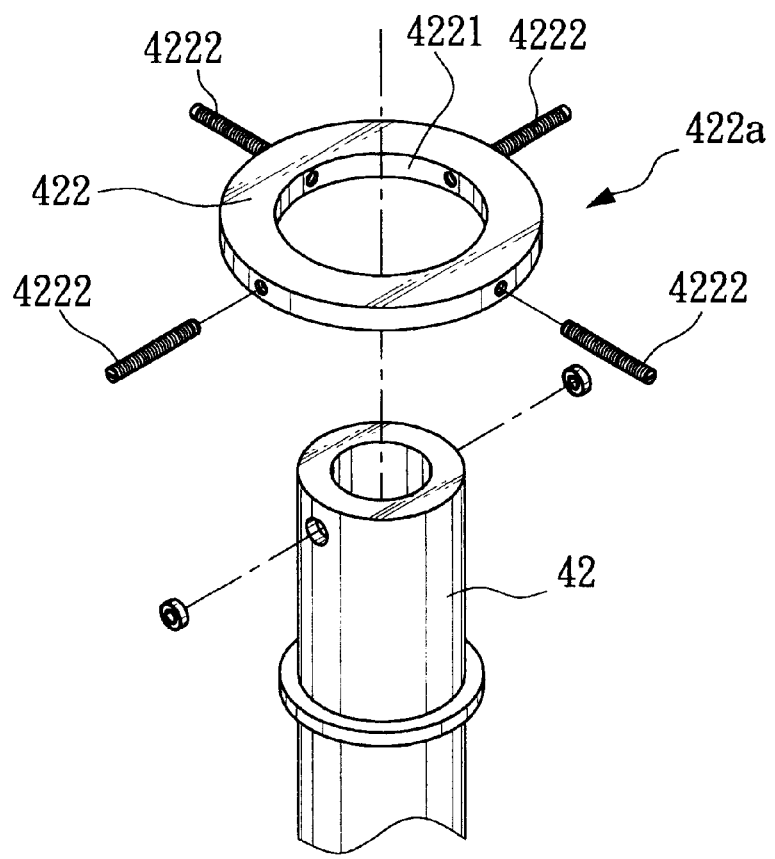
FIG. 5A is an exploded perspective view of one embodiment of the counterweight mechanism that can be used with the apparatus of FIG. 1.
Figure 5B:
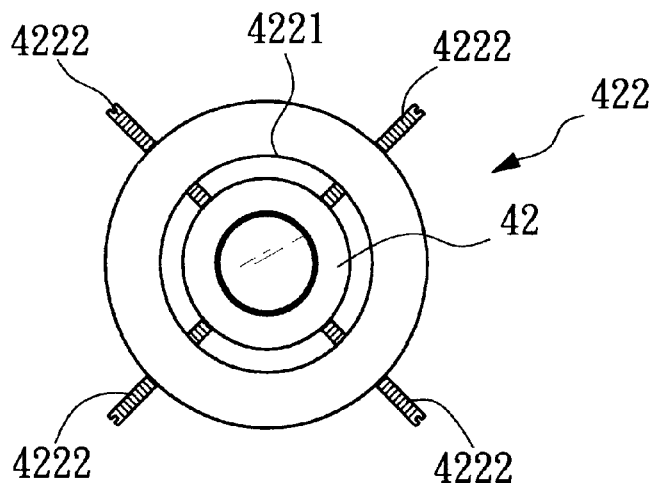
FIG. 5B is a cross-sectional view of the counterweight mechanism of FIG. 5A.
Figure 5C:
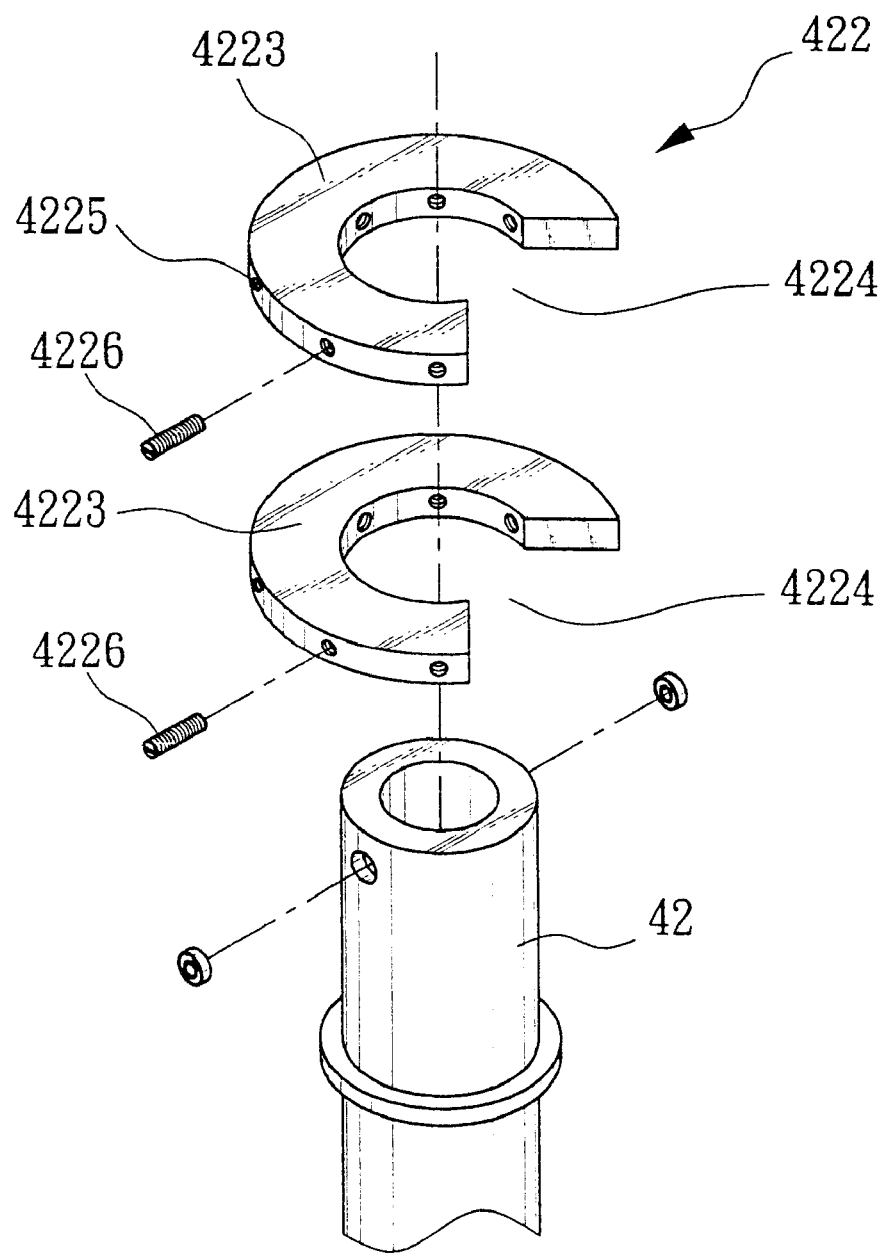
FIG. 5C is an exploded perspective view of another embodiment of the counterweight mechanism which is shown in use with the apparatus of FIG. 1.

FIGS. 5A and 5B illustrate one embodiment of a counterweight mechanism 422*a*, and FIG. 5C illustrates another embodiment of a counterweight mechanism 422, which is also shown in use with the main body 40 in FIGS. 1, 3A and 3B. The counterweight mechanisms 422 and 422*a* function to adjust the position of the center of gravity of the hanging body 42. Referring first tothe embodiment of FIGS. 5A and 5B, the counterweight mechanism 422*a* can be a ring-shaped structure having an inner hole 4221. In this embodiment of the present invention, the counterweight mechanism 422*a* is a circular ring, although it can be configured differently (e.g., a square ring), or as illustrated in FIG. 5C below. The inner hole 4221 is larger than the outer circumferential surface of the hanging body 42. A plurality of screws 4222 may be inserted through corresponding openings in the ring-shaped structure and into the inner hole 4221 to be secured to corresponding openings in the hanging body 42. By changing the protruding length of the one or more screws 4222, the connection position of the counterweight mechanism 422 along the hanging body 42 can be adjusted up or down to change the position of the center of gravity.

Referring now to the embodiment of FIG. 5C, the counterweight mechanism 422 is arranged with two counterweight arcs 4223, each having an open notch 4224. A plurality of screws 4226 may be inserted through corresponding openings 4225 in the arcs 4223 to be secured to corresponding openings in the hanging body 42. By changing the protruding length of the one or more screws 4226, the connection position of the counterweight mechanism 422 along the hanging body 42 can be adjusted up or down to change the position of the center of gravity.

The counterweight mechanisms 422 and 422a function to allow the user to obtain a completely straight and vertical central axis line 421 (and hence a completely straight and vertical point light 4412) by adjusting the counterweight mechanism 422 or 422a. In particular, the counterweight mechanism 422 can be micro-adjusted in one or both of two ways. First, the user can turn one or more of the screws 4226 in or out, or using different numbers or arrangements of the screws 4226, to tilt the balance of the hanging body 42. For example, using a greater number of screws 4226 on one side of the body 42 will change the center of gravity of the body 42. Second, the user can rotate the position of one or both of the arcs 4223 with respect to each other or with respect to the hanging body 42 to obtain the desired balance of the hanging body 42.

Figure 6A:
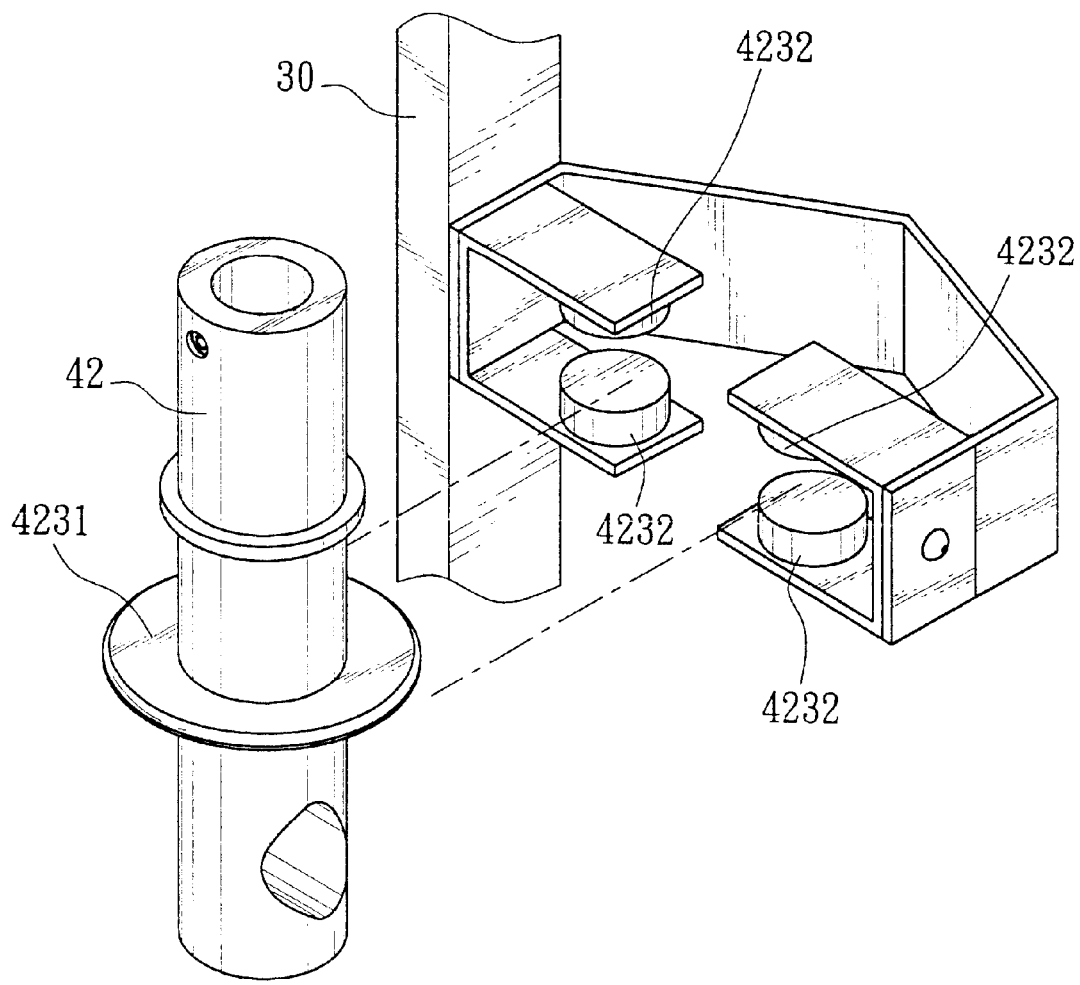
FIG. 6A is an exploded perspective view of one embodiment of the damping mechanism that is shown in use with the apparatus of FIG. 1.

FIG. 6A illustrates the damping mechanism 423 according to one embodiment of the present invention, which includes a copper ring 4231 and a set of magnets 4232. The copper ring 4231 is connected to the hanging body 42 (e.g., by a snap-fit engagement), and can be configured as a circular ring, although other configurations (e.g., square) can also be used. Referring also to FIG. 1, the set of magnets 4232 is connected to the frame body 30 and is arranged to generally surround the copper ring 4231. In this embodiment, the set has four magnets 4232, with two magnets 4232 arranged on a plane above the copper ring 4231 which extends and passes through the center point of the copper ring 4231, and with two magnets 4232 arranged on a plane below the copper ring 4231 which extends and passes through the center point of the copper ring 4231. The magnets 4232 can be arranged in any other desired manner about the copper ring 4231, and any number of magnets can be provided.

Figure 6B:
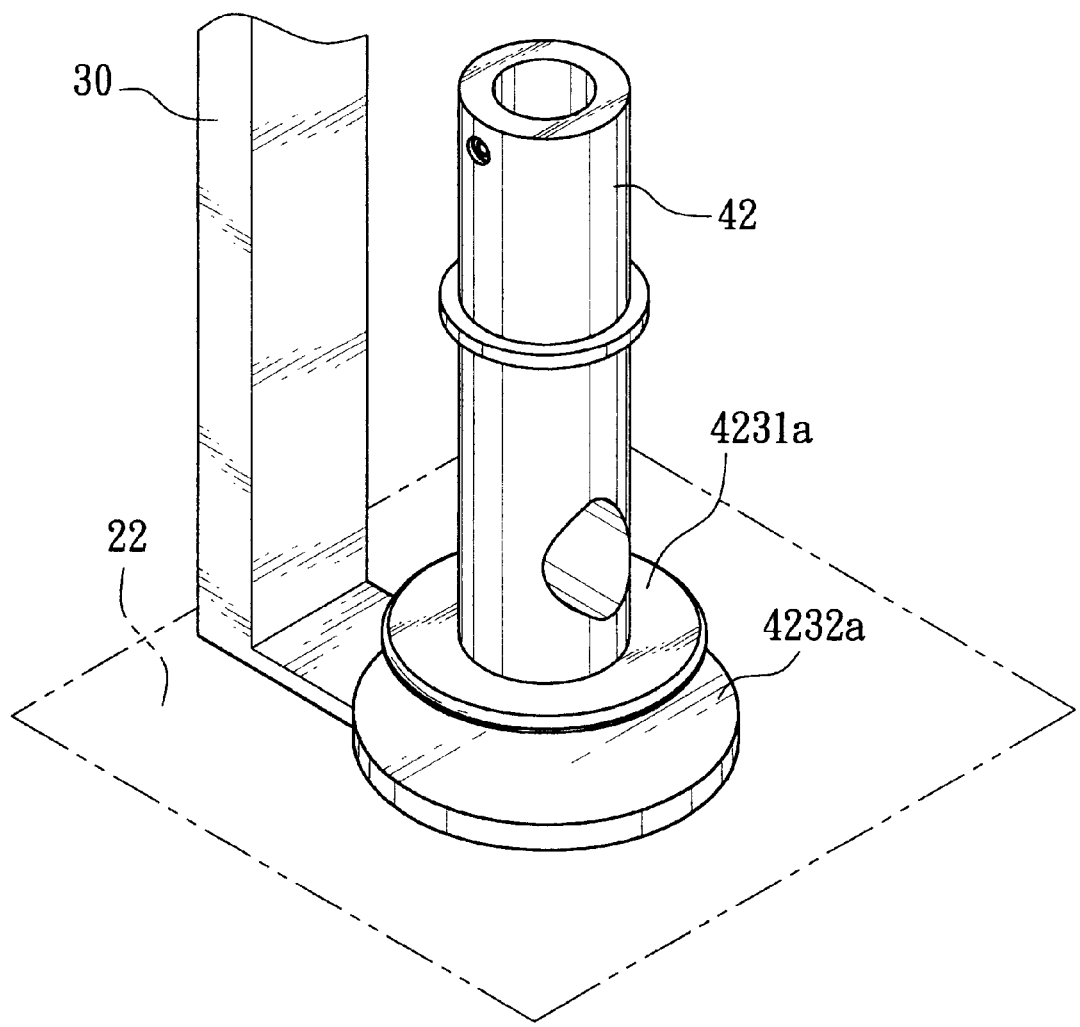
FIG. 6B is a perspective view of another embodiment of the damping mechanism that can be used with the apparatus of FIG. 1.

FIG. 6B illustrates the damping mechanism 423 according to another embodiment of the present invention, where the copper ring 4231a is positioned adjacent the bottom of the hanging body 42. The set of magnets 4232a now has one magnet piece 4232a, and is positioned below the copper ring 4231a. Therefore, with the above two arrangements illustrated in FIGS. 6A and 6B, when the hanging body 42 (having the copper ring 4231 or 4231a) is suspended from the frame body 30, swinging of the copper ring 4231 or 4231a is reduced because a magnetic field is induced when the swinging copper ring 4231, 4231a passes through the magnets 4232, 4232a and the induced magnetic field will repel the original magnetic field.

Figure 7:
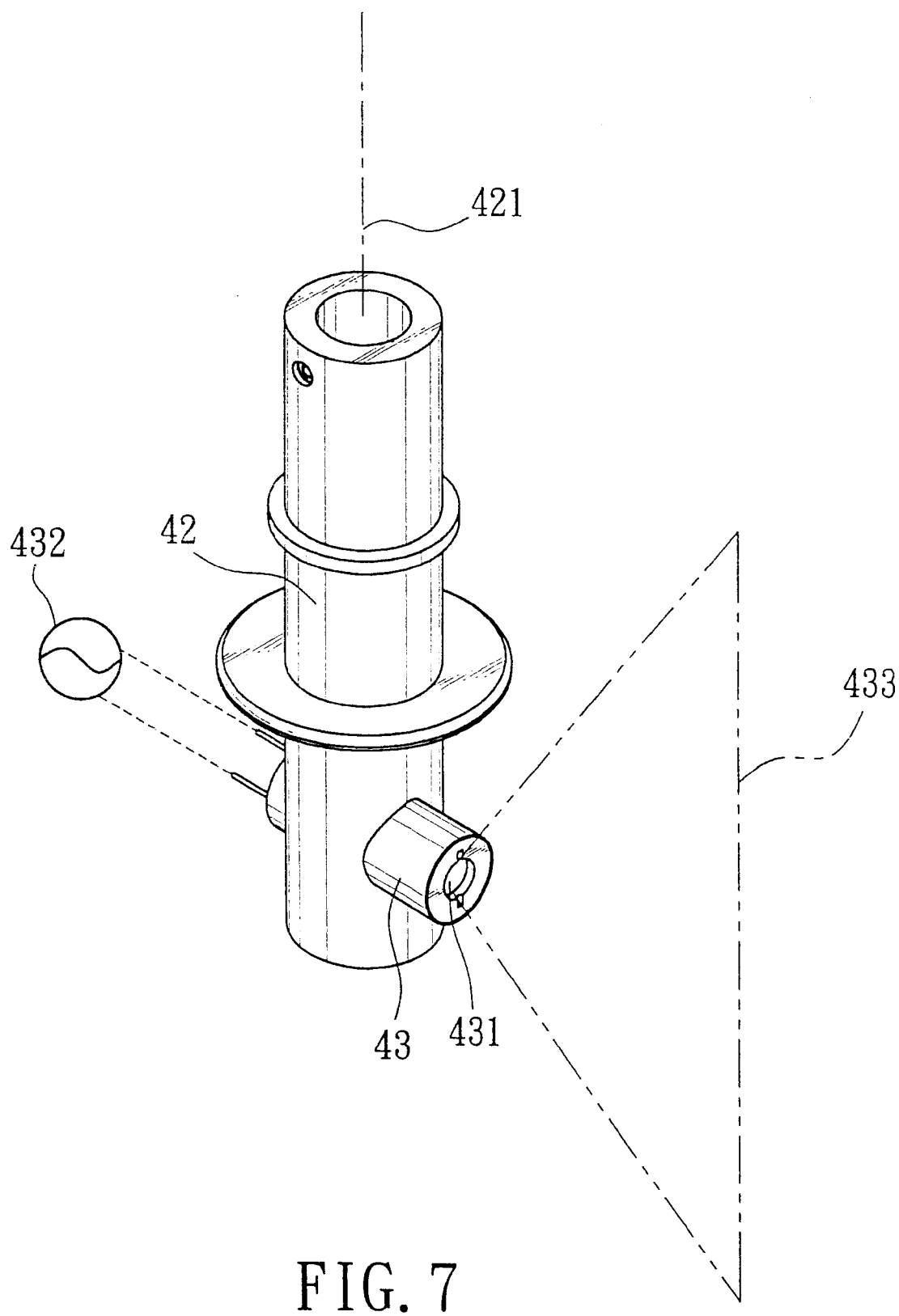
FIG. 7 is a perspective view of a first projection light-source mechanism that can be used with the apparatus of FIG. 1.

FIG. 7 illustrates the first projection light-source mechanism 43, which can be generally cylindrical and extends transversely from the hanging body 42. The first projection light-source mechanism 43 has a light emitter 431 that may be connected to and powered by a power source 432. The light emitter 431 will project a light 433 that resembles a straight vertical line. The projected light 433 is made to be parallel to the central axis line 421 by connecting the first projection light-source mechanism 43 to the hanging body 42 at a transverse orientation with an appropriately calibrated angle between the first projection light-source mechanism 43 to the hanging body 42.

Figure 8:
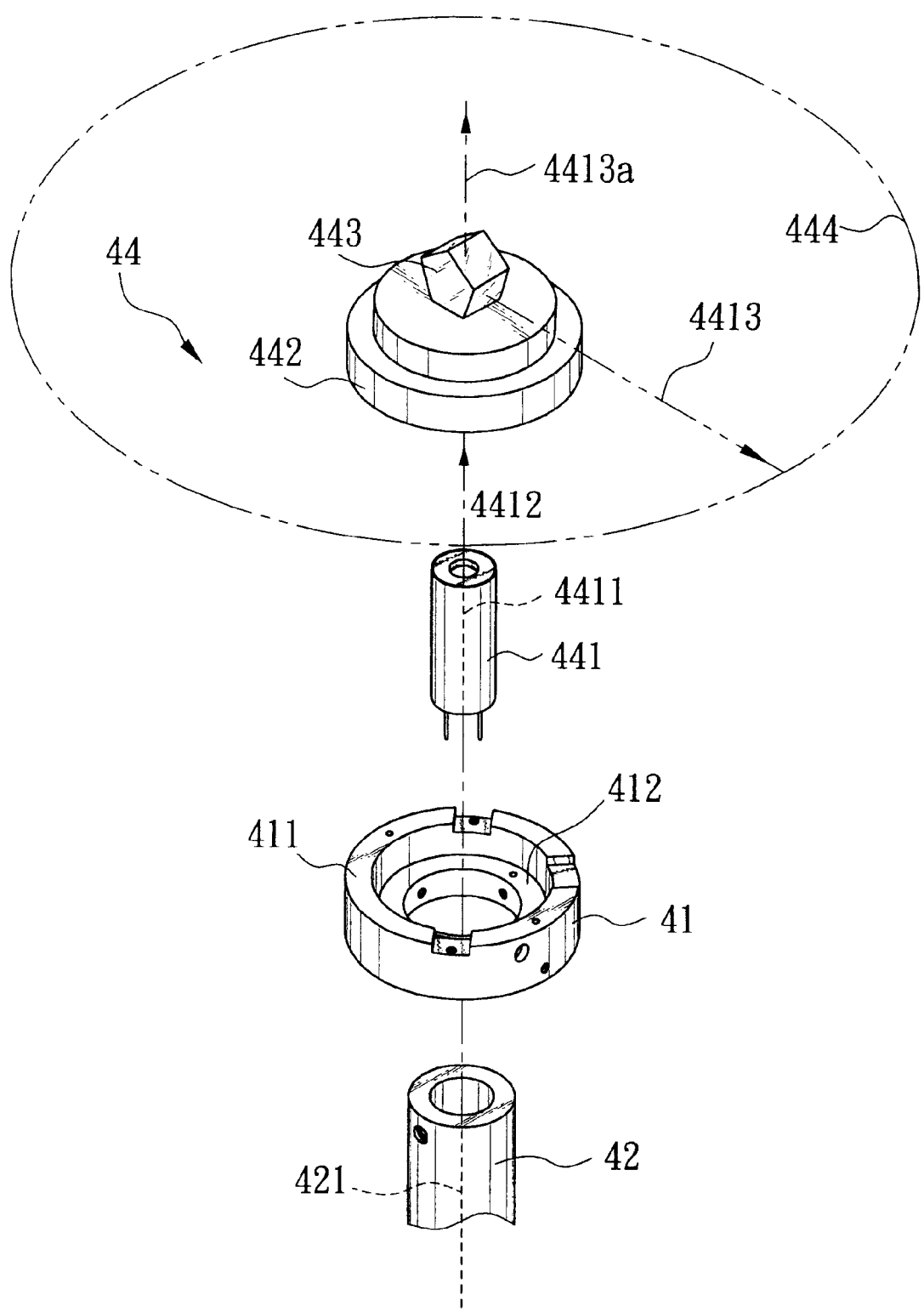
FIG. 8 is an exploded perspective view of a second projection light-source mechanism that can be used with the apparatus of FIG. 1.

FIG. 8 illustrates the second projection light-source mechanism 44, which is seated inside the outer sheath ring 411 and connected to the hanging body 42 via screws (not shown). The second projection light-source mechanism 44 includes a point light-source projector 441, a rotary motor 442, and a pentagonal rhombus-mirror 443. The point light-source projector 441 is cylinder-shaped and is secured inside the hanging body 42 by screws (not shown). The central axis line 4411 of the point light-source projector 441 is parallel to, and can be co-extensive with, the central axis line 421 of the hanging body 42. The point light-source projector 441 can project a point light 4412 which has a path or axis that is parallel to or coincident with the central axis line 421. In addition, the pentagonal rhombus-mirror 443 refracts the received point light 4412 into a refracted point light 4413 that can be transverse to the path of the point light 4412, and it is possible to obtain a different point of the refracted point light 4413 with the same horizontal height. The pentagonal rhombus-mirror 443 of the invention can also refract the received point light 4412 into two refracted points, one of which is the refracted point light 4413 which is transverse to the path of the point light 4412, and another of which is a refracted point light 4413a that is coincident with the central axis line 421 of the hanging body 42. The rotary motor 442, which is retained inside the outer sheath ring 411 of the hanging mechanism 41, may be driven by power from a battery (not shown) that is delivered by wires (not shown). The pentagonal rhombus-mirror 443 is connected with the top surface of the rotary motor 442, so that when the rotary motor 442 rotates the pentagonal rhombus-mirror 443, the refracted point light 4413 forms a light ring 444 that comprises different points of the same horizontal height. In addition, when the speed of rotation increases, the light ring 444 becomes clearer.

Figure 9A:
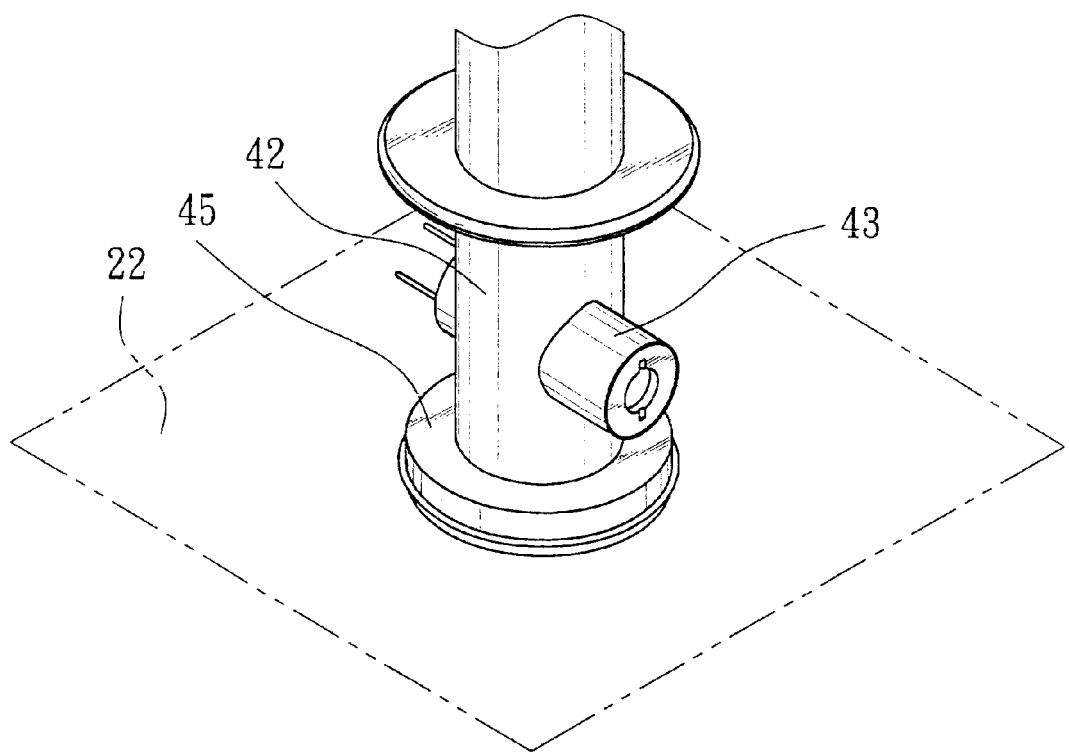
FIG. 9A is a perspective view of an alarm mechanism that can be used with the apparatus of FIG. 1.
Figure 9B:
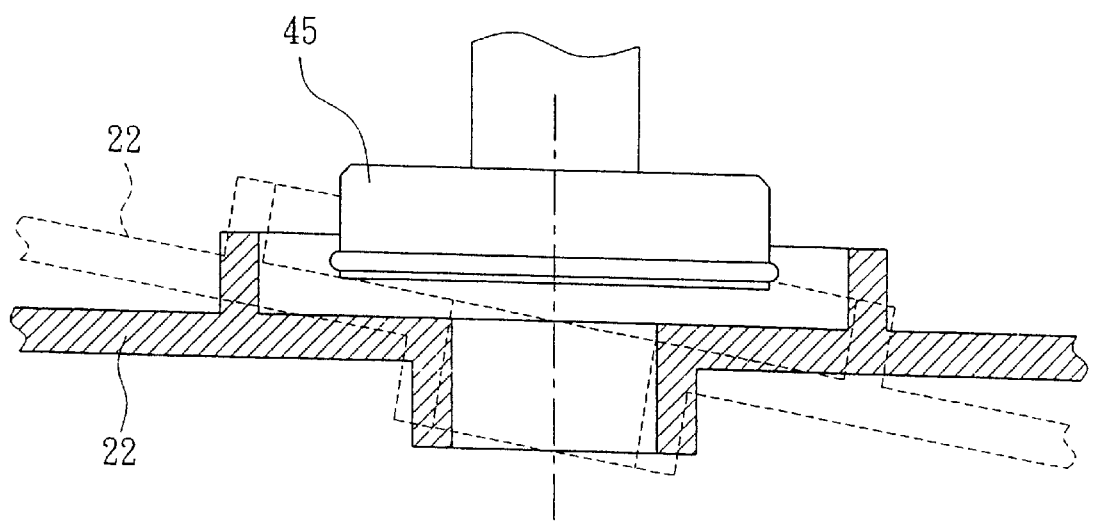
FIG. 9B is a cross-sectional view of the alarm mechanism of FIG. 9A.

FIGS. 9A and 9B illustrate the alarm mechanism 45, which is connected to the hanging body 42 and positioned adjacent the platform portion 22. When the platform portion 22 is inclined at an angle, the alarm mechanism 45 will touch the platform portion 22 (as shown in broken lines in FIG. 9B) to set off an alarm signal. In this regard, the alarm mechanism 45 can be made of copper and the platform portion 22 can be made of aluminum, so that a closed electrical circuit will be created when the alarm mechanism 45 contacts the platform portion 22 to trigger an alarm at the PC board (not shown). Thus, the contact between the alarm mechanism 45 and the platform portion 22 operates like a switch to trigger an alarm. The alarm signal may be in the form of a flashing light from a lamp indicator, noise from a beeper, or other similar devices that are known in the art.

All the elements shown in FIGS. 1–9B can be housed inside a casing (not shown), with the PC board, batteries and wiring all retained inside the casing.

The operation of the laser projection apparatus of the present invention will now be described. First, the laser projection apparatus is placed on a surface, such as a working table 10. When the surface or working table 10 is inclined, the alarm mechanism 45 will contact the platform portion 22 and set off an alarm signal. At this time, the alarm mechanism 45 can be made to not contact the platform portion 22 (i.e., the alarm can be turned off) by adjusting the inclination angle of the platform portion 22 relative to the base seat 21. The hanging body 42 may be suspended by gravity and secured by the frame body 30, with adjustments made to ensure that the central axis line 421 is completely vertical to the ground surface. At this time, the straight light 433 projected from the first projection light-source mechanism 43 is vertical to the ground surface 50, while the light ring 444 projected from the second light-source mechanism 44 is parallel to the ground surface 50. Therefore, the vertical and horizontal lights 433 and 444, respectively, can be accurately projected even if the laser projection apparatus is being used in an undulated or uneven topography. In the event that the laser projection apparatus experiences interference and vibration from external influences, the damping mechanism 423 will help the hanging body 42 to quickly reach a stationary position.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A laser projection apparatus, comprising:
    an adjustment platform having a base seat, a platform portion that is adjustably coupled to the base seat, and an adjustment mechanism that is operatively coupled to the base seat and the platform portion to adjust the inclination angle of the platform portion with respect to the base seat;
    a frame body that is connected to the adjustment platform;
    a column that is suspended by the frame body to be separated from the adjustment platform by a distance, the column defining a central axis; and
    a projection light-source mechanism that is connected to the column and which projects a straight light that is co-extensive with the central axis;
    wherein the adjustment mechanism further includes:
        a protrusion block which is fixed on the base seat;
        an inclination block retained inside the platform portion, the inclination block having a ramped surface that contacts the protrusion block;
        a screw rod which is coupled the platform portion and the inclination block; and
        wherein the screw rod is rotated to cause linear displacement of the protrusion block along the ramped surface.

2. The apparatus of claim 1, wherein projection light-source mechanism is a first projection light-source mechanism, further including a second projection light-source mechanism which is connected to the column and which projects a light ring that is transverse to the central axis.

3. The apparatus of claim 2, further including a hanging mechanism which is connected with the frame body and the column, and which receives the second projection light-source mechanism.

4. The apparatus of claim 1, further including a hanging mechanism which is connected with the frame body and the column.

5. The apparatus of claim 1, further including a counterweight coupled to the column.

6. The apparatus of claim 1, further including a damping mechanism operatively coupled to the frame body and the column.

7. The apparatus of claim 6, wherein the damping mechanism includes:
    a copper ring that is connected with the column; and
    at least one magnet which is connected to the frame body and arranged about the copper ring.

8. The apparatus of claim 1, further including means for biasing the platform portion from the base seat.

9. A laser projection apparatus, comprising:
    an adjustment platform having a base seat, a platform portion that is adjustably coupled to the base seat, and an adjustment mechanism that is operatively coupled to the base seat and the platform portion to adjust the inclination angle of the platform portion with respect to the base seat;
    a frame body that is connected to the adjustment platform;
    a column that is suspended by the frame body to be separated from the adjustment platform by a distance, the column defining a central axis;
    a projection light-source mechanism that is connected to the column and which projects a straight light that is co-extensive with the central axis; and
    a hanging mechanism which is connected with the frame body and the column;
    wherein the hanging mechanism further includes an outer ring sheath which is connected with the frame body and an inner ring sheath that is retained inside the outer ring sheath.

10. The apparatus of claim 9, wherein the inner ring sheath has a first set of connectors that connects the inner ring sheath to the outer ring sheath, and a second set of connectors that connects the inner ring sheath to the column, with each set of connectors having an axis that intersects the axis of the other set of connectors.

11. A laser projection apparatus, comprising:
    an adjustment platform having a base seat, a platform portion that is adjustably coupled to the base seat and an adjustment mechanism that is operatively coupled to the base seat and the platform portion to adjust the inclination angle of the platform portion with respect to the base seat;
    a frame body that is connected to the adjustment platform;
    a column that is suspended by the frame body to be separated from the adjustment platform by a distance, the column defining a central axis;
    a projection light-source mechanism that is connected to the column and which projects a straight light that is co-extensive with the central axis; and
    a counterweight coupled to the column;
    wherein the column has an outer circumference, and wherein the counterweight comprises a ring-shaped structure having inner hole that is larger than the outer circumference of the column.

12. The apparatus of claim 11, further including means for adjusting the position of the ring-shaped structure along the column.

13. A laser projection apparatus, comprising:
    an adjustment platform having a base seat, a platform portion that is adjustably coupled to the base seat, and an adjustment mechanism that is operatively coupled to the base seat and the platform portion to adjust the inclination angle of the platform portion with respect to the base seat;
    a frame body that is connected to the adjustment platform;
    a column that is suspended by the frame body to be separated from the adjustment platform by a distance, the column defining a central axis;
    a projection light-source mechanism that is connected to the column and which projects a straight light that is co-extensive with the central axis; and
    a counterweight coupled to the column;
    wherein the counterweight comprises at least one arc-shaped structure having a notch.

14. The apparatus of claim 13, further including means for adjusting the position of the arc-shaped structure along the column.

15. A laser projection apparatus, comprising:
    an adjustment platform having a base seat, a platform portion that is adjustably coupled to the base seat, and an adjustment mechanism that is operatively coupled to the base seat and the platform portion to adjust the inclination angle of the platform portion with respect to the base seat;

a frame body that is connected to the adjustment platform;

a column that is suspended by the frame body to be separated from the adjustment platform by a distance, the column defining a central axis;

a projection light-source mechanism that is connected to the column and which projects a straight light that is co-extensive with the central axis; and an alarm mechanism that is connected with the column and operationally coupled to the platform portion to sound an alarm when the alarm mechanism contacts the platform portion.

16. The apparatus of claim 5, further including a damping mechanism operatively coupled to the frame body and the column.

17. A laser projection apparatus, comprising:

an adjustment platform having a base seat, a platform portion that is adjustably coupled to the base seat, and an adjustment mechanism that is operatively coupled to the base seat and the platform portion to adjust the inclination angle of the platform portion with respect to the base seat;

a frame body that is connected to the adjustment platform;

a column that is suspended by the frame body to be separated from the adjustment platform by a distance, the column defining a central axis;

a hanging mechanism which is connected with the frame body and the column;

a first projection light-source mechanism that is connected to the column and which projects a straight light that is co-extensive with the central axis;

a second projection light-source mechanism which is connected to the column and which projects a light ring that is transverse to the central axis, wherein the second projection light-source mechanism includes:

a light projector coupled to the hanging mechanism and emitting a light along a light emission line that is coincident with the central axis of the column;

a rotary motor supported on the hanging mechanism; and a mirror which is coupled to the rotary motor and which refracts the light emitted from the light projector.

18. The apparatus of claim 17, wherein the light emitted from the light projector is perpendicular to the refracted light.

19. A laser projection apparatus, comprising:

an adjustment platform having a base seat, a platform portion that is adjustably coupled to the base seat, and an adjustment mechanism that is operatively coupled to the base seat and the platform portion to adjust the inclination angle of the platform portion with respect to the base seat;

a frame body that is connected to the adjustment platform;

a column that is suspended by the frame body to be separated from the adjustment platform by a distance, the column defining a central axis; and a projection light-source mechanism that is connected to the column and which projects a light ring that is transverse to the central axis.

20. The apparatus of claim 19, wherein projection light-source mechanism is a second projection light-source mechanism, further including a first projection light-source mechanism which is connected to the column and which projects a straight light that is co-extensive with the central axis.

* * * * *